United States Patent
Sakuma

(10) Patent No.: US 7,994,680 B2
(45) Date of Patent: Aug. 9, 2011

(54) MOTOR INCLUDING ELECTRICAL SHEETS HAVING SHEAR DROOPS

(75) Inventor: Masafumi Sakuma, Chiryu (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 288 days.

(21) Appl. No.: 12/361,118

(22) Filed: Jan. 28, 2009

(65) Prior Publication Data

US 2009/0195111 A1 Aug. 6, 2009

(30) Foreign Application Priority Data

Feb. 5, 2008 (JP) ................................ 2008-024767

(51) Int. Cl.
*H02K 1/12* (2006.01)
*H02K 15/02* (2006.01)
*H02K 1/06* (2006.01)

(52) U.S. Cl. ............. 310/216.004; 310/216.016; 29/596

(58) Field of Classification Search ........... 310/216.004, 310/216.009; 29/596, 598; *H02K 1/00, H02K 1/06, 1/12, 1/14, 1/16, 1/18, 15/02*
See application file for complete search history.

(56) References Cited

U.S. PATENT DOCUMENTS

| | | | | |
|---|---|---|---|---|
| 3,110,831 A | * | 11/1963 | Zimmerle | 310/216.048 |
| 6,729,011 B2 | * | 5/2004 | Asao et al. | 310/254.1 |
| 2006/0232159 A1 | * | 10/2006 | Tamaoka | 310/216 |
| 2007/0057588 A1 | * | 3/2007 | Hyodo et al. | 310/154.07 |
| 2008/0012445 A1 | * | 1/2008 | Abe et al. | 310/217 |

FOREIGN PATENT DOCUMENTS

| JP | 2003-180043 A | | 6/2003 |
|---|---|---|---|
| JP | 2003180043 A | * | 6/2003 |
| JP | 2005-151648 A | | 6/2005 |

\* cited by examiner

*Primary Examiner* — Quyen Leung
*Assistant Examiner* — Michael Andrews
(74) *Attorney, Agent, or Firm* — Sughrue Mion, PLLC

(57) ABSTRACT

A motor includes an output shaft rotatably provided, a rotor fixed to the output shaft and rotatable with the output shaft, a stator formed by a lamination of plurality of electrical steel sheets made by a magnetic material, the electrical steel sheets being punched by means of a press working, a coil wound at the stator, and a case accommodating the stator and the rotor and including a holder for holding the stator. The electrical steel sheets are arranged at one end of the stator in a lamination direction thereof and at the other end of the stator in the lamination direction thereof respectively. The electrical steel sheets include surfaces each at which a shear droop is formed. The surfaces of the electrical steel sheets face each other.

6 Claims, 3 Drawing Sheets

MOTOR INCLUDING ELECTRICAL SHEETS HAVING SHEAR DROOPS

CROSS REFERENCE TO RELATED APPLICATIONS

This application is based on and claims priority under 35 U.S.C. §119 to Japanese Patent Application No. 2008-024767, filed on Feb. 5, 2008, the entire content of which is incorporated herein by reference.

FIELD OF THE INVENTION

This invention generally relates to a motor. More particularly, the invention pertains to a motor including a stator formed by a lamination of electrical steel sheets.

BACKGROUND

A known motor includes a stator, a rotor, and a shaft. For example, a motor disclosed in JP2005-151648A includes a stator constituted by a lamination of multiple electrical steel sheets (i.e., first electrical steel sheets) and a lamination of multiple electrical steel sheets (i.e., second electrical steel sheets) arranged at both axial sides of the lamination of the first electrical steel sheets. Each of the second electrical steel sheets has a larger thickness than that of the first electrical steel sheet so as to prevent the first electrical steel sheets from buckling or deforming by a stress applied radially outwardly when the stator is mounted or held at a case.

According to the motor disclosed in JP2005-151648A, because the first electrical steel sheet and the second electrical steel sheet, which have different thicknesses from each other, are used, possible increase in iron loss of the motor may cause deterioration of rotation efficiency of the motor.

A need thus exists for a motor which is not susceptible to the drawback mentioned above.

SUMMARY OF THE INVENTION

According to an aspect of the present invention, a motor includes an output shaft rotatably provided, a rotor fixed to the output shaft and rotatable with the output shaft, a stator formed by a lamination of plurality of electrical steel sheets made by a magnetic material, the electrical steel sheets being punched by means of a press working, a coil wound at the stator, and a case accommodating the stator and the rotor and including a holder for holding the stator. The electrical steel sheets are arranged at one end of the stator in a lamination direction thereof and at the other end of the stator in the lamination direction thereof respectively. The electrical steel sheets include surfaces each at which a shear droop is formed. The surfaces of the electrical steel sheets face each other.

According to another aspect of the present invention, a method for manufacturing a motor which includes a rotor, a stator formed by a lamination of electrical steel sheets, and a case accommodating the rotor and the stator, the method includes a press process for forming the electrical steel sheets by means of a press working, a lamination process for laminating the electrical steel sheets so that surfaces of the electrical steel sheets arranged at one end of the stator in a lamination direction thereof and at the other end of the stator in the lamination direction thereof respectively facing each other, each of the surfaces at which a shear droop is formed, and a fixation process for fixing the stator being laminated to the case.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment will be explained with reference to the attached drawings.

Figure 1:
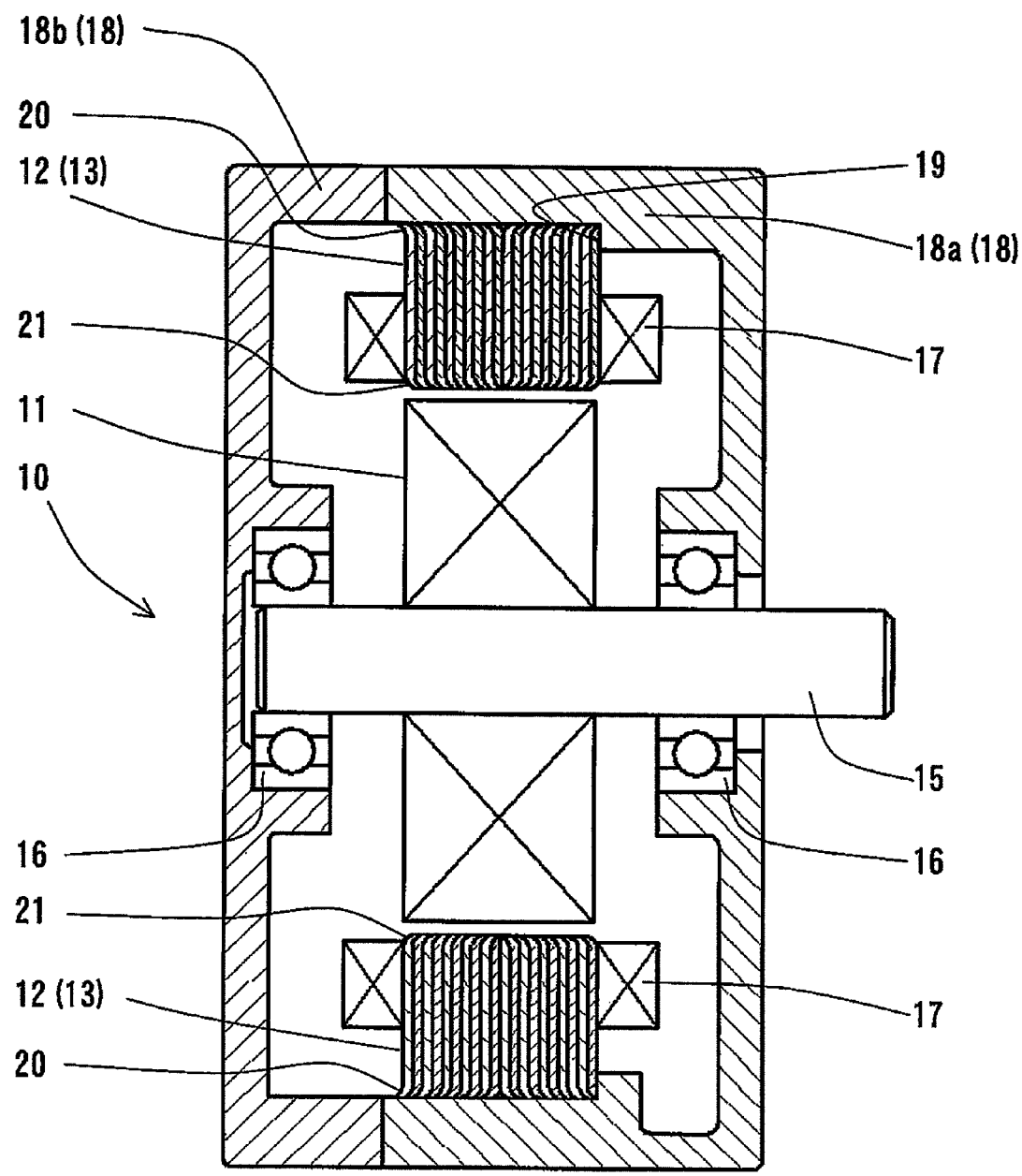
FIG. 1 is a schematic cross-sectional view illustrating a motor according to an embodiment of the present invention.
Figure 2:
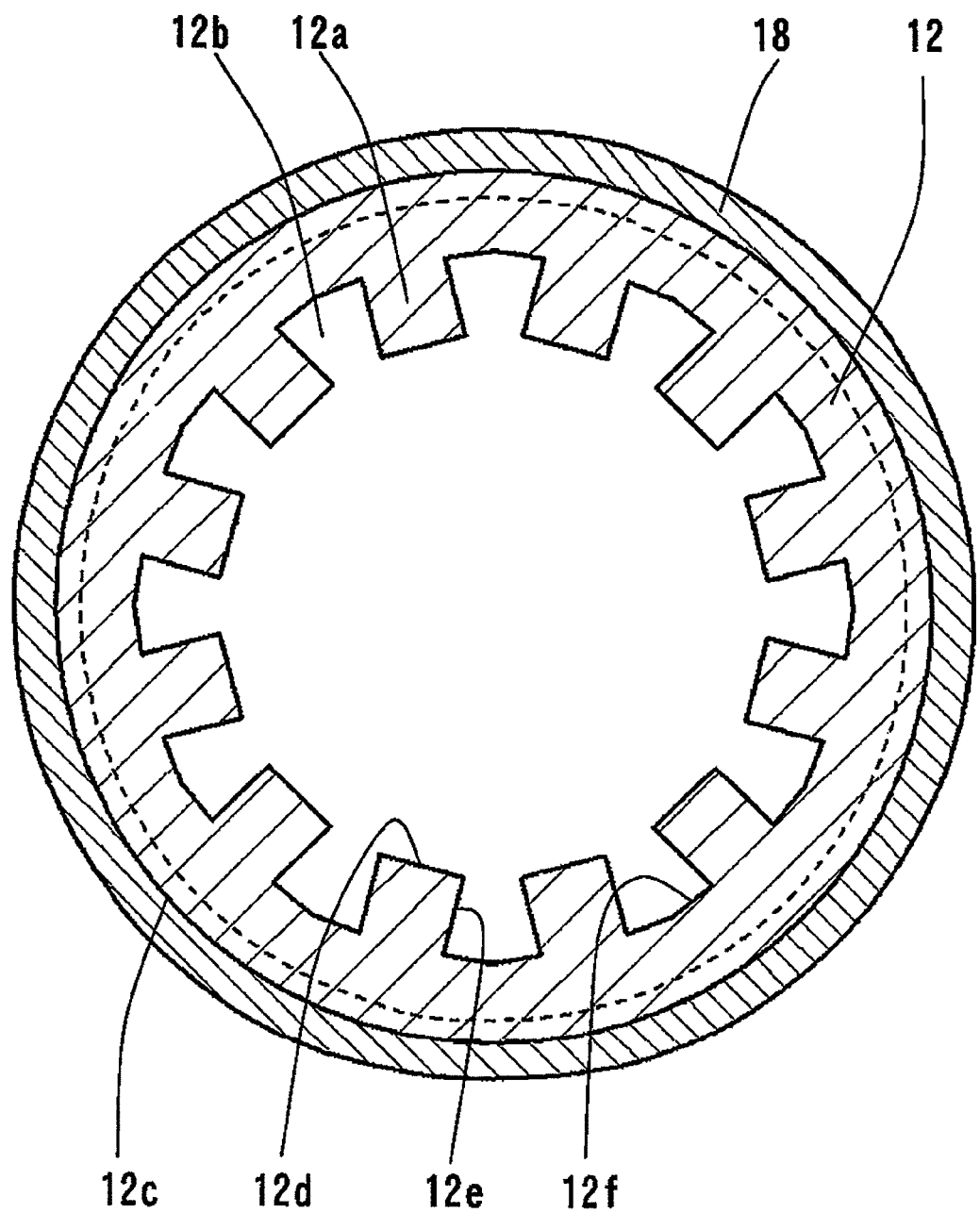
FIG. 2 is a schematic cross-sectional view illustrating a stator and a case of the motor according to the embodiment of the present invention.

As illustrated in FIGS. 1 and 2, a motor 10 includes a rotor 11, a stator 12, a coil 17, a case 18, an output shaft 15, and a bearing 16.

The case 18 includes a first case 18a equipped with a stator holder 19 serving as a holder for stabilizing the stator 12 and a second case 18b.

The rotor 11 is formed into a substantially column shape with a lamination of electrical steel sheets for rotor.

The output shaft 15 is rotatably supported by the bearing 16 that is fitted to the case. The output shaft 15 is rotatable along with the rotor 11.

The stator 12 is formed into a substantially cylindrical shape with a lamination of electrical steel sheets 13. The stator 12 includes multiple teeth 12a and slots 12b at an inner peripheral surface as illustrated in FIG. 2. The teeth 12a extend in a radially inward direction. Each of the slots 12b having a substantially recess shape is formed between the teeth 12a adjacent to each other.

The electrical steel sheets 13 are generally punched by means of a press working. The resulting punching surface of each of the electrical steel sheets 13 is formed by a sheared surface (i.e., sheared portion) where a shear droop 21 is generated and a fractured surface where a burr 20 is generated. The shear droop 21 in this case indicates a rounded (curvature) portion obtained through a plastic deformation of a corner portion of a workpiece, and the like generated upon press working.

Figure 3A:
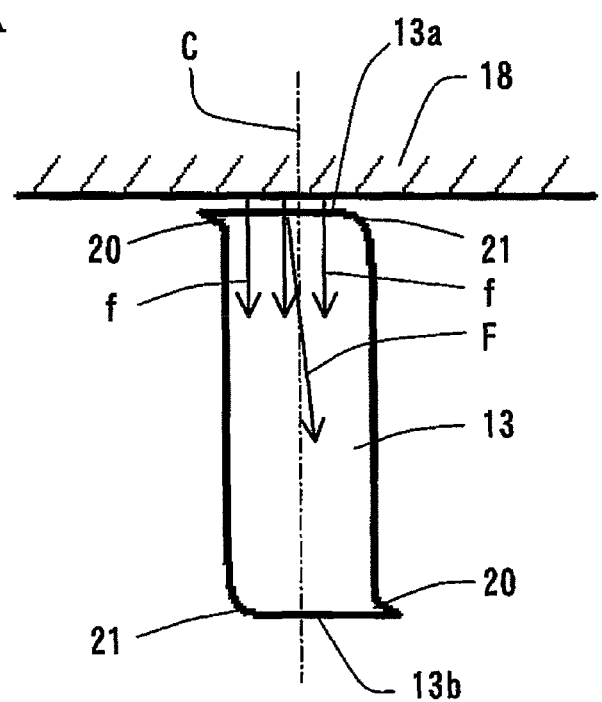
FIG. 3A is an explanatory view illustrating a stress applied radially outwardly to an outer peripheral surface of an electrical steel sheet.
Figure 3B:
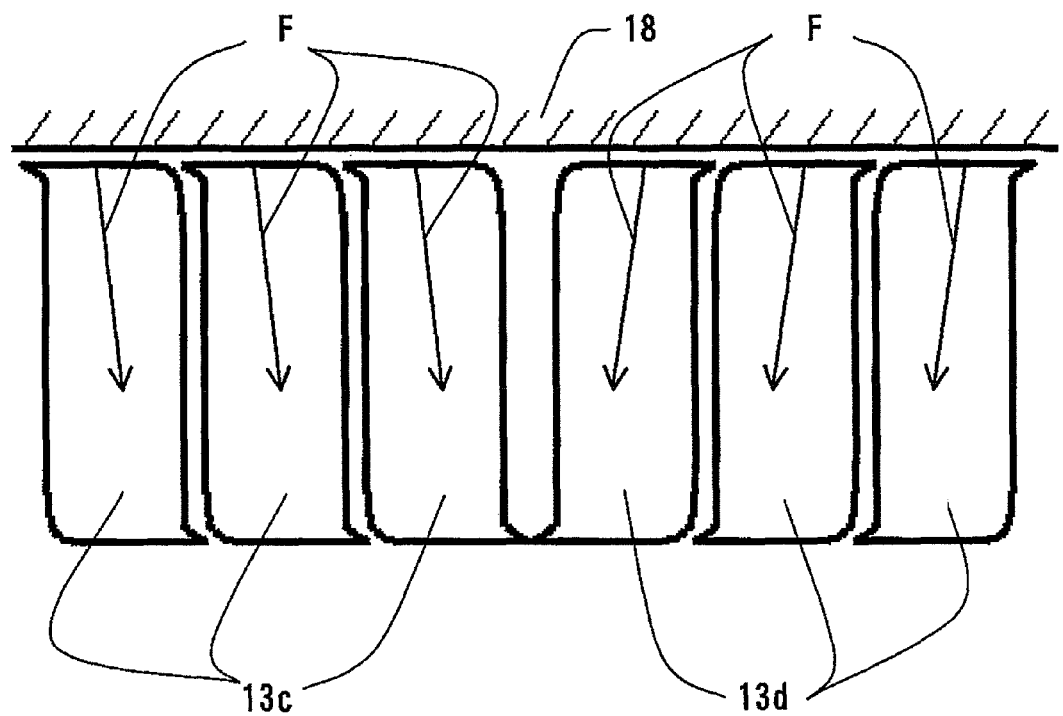
FIG. 3B is an explanatory view illustrating a stress applied radially outwardly to outer peripheral surfaces of multiple electrical steel sheets.

As illustrated in FIG. 3A, each of the electrical steel sheets 13 constituting the stator 12 includes an outer peripheral surface 13a and an inner peripheral surface 13b. The outer peripheral surfaces 13a of the respective electrical steel sheets 13 collectively form an outer peripheral surface of the stator 12 while the inner peripheral surfaces 13b of the respective electrical steel sheets 13 collectively form an inner peripheral surface of the stator 12. The outer peripheral surface 13a and the inner peripheral surface 13b are punched in different directions from each other (i.e., different punching directions). As illustrated in FIGS. 1, 3A, and 3B, a positional relationship between the sheared surface and the fractured surface is different at the outer peripheral surface 13a and the inner peripheral surface 13b of each of the electrical steel sheets 13.

Substantially a half of the total electrical steel sheets 13 (i.e., a half of total lamination layers of the electrical steel sheets 13) are laminated so that the punching directions thereof are same as one another, thereby forming first electrical steel sheets 13c. Another half of the total electrical steel sheets 13 (i.e., another half of the total lamination layers of the electrical steel sheets 13) are laminated so that the punching directions thereof are same as one another, thereby forming second electrical steel sheets 13d. Then, a lamination of the first electrical steel sheets 13c and a lamination of the second electrical steel sheets 13d are assembled onto each other for constituting the stator 12 in such a way that the punching direction of the lamination of the first electrical steel sheets 13c and the punching direction of the lamination of the second electrical steel sheets 13d are different from each other. That is, surfaces, each at which the shear droop 21 is generated upon punching, of the first electrical steel sheets 13c face surfaces, each at which the shear droop 21 is generated upon punching, of the second electrical steel sheets 13d as illustrated in FIG. 3B. As a result, the stator 12 includes fractured surfaces, each at which the burr 20 is formed, at corner portions 12c provided at both axial ends of the outer peripheral surface and sheared surfaces, each at which the shear droop 21 is formed, at corner portions 12d, 12e, and 12f provided at both axial ends of the inner peripheral surface.

Next, the coil 17 is received at each of the slots 12b while being wound at each of the teeth 12a of the stator 12 that has been formed by the lamination of the first and second electrical steel sheets 13c and 13d as mentioned above. Because the corner portions 12d, 12e and 12f provided at the both axial ends of the inner peripheral surface of the stator 12 are formed by the sheared surfaces, each in which the shear droop is formed, i.e., no sharp angle portions are present, an insulating member coating a conductive wire that constitutes the coil 17 is prevented from being damaged when the conductive wire is wound at each of the teeth 12a.

The stator 12 is then press-fitted or shrink-fitted to the case 18 at the outer peripheral surfaces 13a of the electrical steel sheets 13 until the stator 12 makes contact with the stator holder 19 of the first case 18a, thereby holding the stator 12 at the case 18. A stress generated at the stator 12 when the stator 12 is fitted to the case 18 for fixation will be explained with reference to FIGS. 3A and 3B.

When the press fitting or shrink fitting is applied upon mounting the stator 12 onto the first case 18a, a stress f is generated and applied from the radially outward side to the inner side on each of the outer peripheral surfaces 13a of the electrical steel sheets 13 constituting the stator 12. However, the outer peripheral surface 13a includes the burr 20 axially outwardly extending to form into a thin fin shape and the shear droop 21 rounded and plastic-deformed towards the radially inner side. Thus, the stress f applied from the radially outer side on each of the electrical steel sheets 13 does not act on the shear droop 21 rounded and plastic-deformed towards the radially inner side, and acts on the burr 20 axially outwardly extending to form into the thin fin shape. That is, when assuming that resultant force of the stress f that acts on the single electrical steel sheet 13 is equal to a stress F, the stress F applied from the radially outward side on the electrical steel sheet 13 acts greatly towards the fractured surface relative to a center line C. That is, the stress F does not act in parallel with the center line C and acts at a tilt towards the fractured surface of the inner peripheral surface 13b of the electrical steel sheet 13 from the fractured surface of the outer peripheral surface 13a of the electrical steel sheet 13. However, the stator 12 is constituted by the lamination of the first electrical steel sheets 13c and the lamination of the second electrical steel sheets 13d assembled onto each other in such a way that the punching directions thereof are different from each other. That is, surfaces, each at which the shear droop 21 is generated upon punching, of the first electrical steel sheets 13c face surfaces, each at which the shear droop 21 is generated upon punching, of the second electrical steel sheets 13d. The corner portion 12c provided at each axial end of the outer peripheral surface of the stator 12 includes the burr 20. Thus, resultant force of the stress F applied from the radially outer side on the entire stator 12 acts in a direction where the first electrical steel sheets 13c and the second electrical steel sheets 13d are pressed against each other, thereby preventing the electrical steel sheets 13 constituting the stator 12 from buckling or deforming.

According to the aforementioned embodiment, the stator 12 includes first electrical steel sheets 13c constituted by the electrical steel sheet 13 arranged at the one end of the stator 12 and a predetermined number of electrical steel sheets 13, punching directions of the electrical steel sheets 13 constituting the first electrical steel sheets 13c being equal to one another. The stator further includes second electrical steel sheets 13d constituted by the electrical steel sheet 13 arranged at the other end of the stator 12 and a predetermined number of electrical steel sheets 13, punching directions of the electrical steel sheets 13 constituting the second electrical steel sheets 13d being equal to one another, the punching directions of the electrical steel sheets 13 constituting the first electrical steel sheets 13c being different from the punching directions of the electrical steel sheets 13 constituting the second electrical steel sheets 13d.

In addition, the first electrical steel sheets 13c are constituted by a half of the total electrical steel sheets 13 while the second electrical steel sheets 13d are constituted by another half of the total electrical steel sheets 13.

According to the aforementioned embodiment, the electrical steel sheets 13 arranged at one end of the stator 12 in the lamination direction thereof and at the other end of the stator 12 in the lamination direction thereof, respectively, are formed in such a manner that the punching directions of the electrical steel sheets 13 arranged at the one end of the stator 12 are different from the punching directions of the electrical steel sheets arranged at the other end of the stator 12. That is, surfaces, each at which the shear droop 21 is generated upon punching, of the electrical steel sheets 13 arranged at the one end of the stator 12 face surfaces, each at which the shear droop 21 is generated upon punching, of the electrical steel sheets 13 arranged at the other end of the stator 12. Accordingly, the stress generated upon securing the stator 2 to the case 18 acts in a direction where the electrical steel sheets 13 arranged at the one end of the stator 12 and the electrical steel sheets 13 arranged at the other end of the stator 12 are pressed against each other for close contact. The electrical steel sheets 13 constituting the stator 2 are prevented from buckling or deforming accordingly.

Because the first electrical steel sheets 13c and the second electrical steel sheets 13d are constituted by a half of the total electrical steel sheets 13 and another half of the total electrical steel sheets 13, respectively, the stress from the both axial ends of the stator 2 may be uniformly applied.

The stator 12 includes an outer peripheral surface fixed to the case 18 and an inner peripheral surface including a plurality of teeth 12a facing the rotor 11 and extending radially inwardly and slots 12b each formed into a recess shape between the teeth 12a adjacent to each other. In addition, the punching directions of outer peripheral surfaces 13a of the electrical steel sheets 13 constituting the outer peripheral surface of the stator 12 are different from the punching directions of at least the slots 12b provided at inner peripheral surfaces 13b of the electrical steel sheets 13 constituting the inner peripheral surface of the stator 12. Further, the shear droop generated upon punching is formed at least at corner portions 12e provided at the teeth 12a facing the slots 12b at both axial ends of the inner peripheral surface of the stator 12.

Because at least the corner portion 12e provided at each of the teeth 12a facing the slot 12b at each axial end of the stator 2 is formed by the shear droop 21 generated upon punching, the corner portion 12e does not include a sharp angle portion, thereby preventing a damage on the insulating member coating the conductive wire that constitutes the coil 17 when the conductive wire is wound at each of the teeth 12a.

The lamination process includes a process for laminating the electrical steel sheet 13 arranged at the one end of the stator 12 and a predetermined number of electrical steel sheets 13, all of which punching directions are equal to one another, and a process for laminating the electrical steel sheet 13 arrange at the other end of the stator 12 and a predetermined number of electrical steel sheets 13, all of which punching directions are equal to one another.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motor comprising:
an output shaft rotatably provided;
a rotor fixed to the output shaft and rotatable with the output shaft;
a stator formed by a lamination of plurality of electrical steel sheets made by a magnetic material, the electrical steel sheets being punched by means of a press working;
a coil wound at the stator; and
a case accommodating the stator and the rotor and including a holder for holding the stator;
the electrical steel sheets arranged at one end of the stator in a lamination direction thereof and at the other end of the stator in the lamination direction thereof respectively, each of the electrical steel sheets including surfaces each at which a shear droop is formed;
wherein the electrical sheets include first electrical steel sheets arranged at the one end of the stator and second electrical steel sheets arranged at the other end of the stator,
wherein outer peripheral surfaces of the first electrical sheets include shear droops forming burrs extending in a direction away from the second electrical sheets, and outer peripheral surfaces of the second electrical sheets include shear droops forming burrs extending in a direction away from the first electrical sheets, and
wherein inner peripheral surfaces of the first electrical sheets include shear droops forming burrs extending in a direction toward the second electrical sheets, and outer peripheral surfaces of the second electrical sheets include shear droops forming burrs extending in a direction toward the first electrical sheets.

2. The motor according to claim 1, wherein the punching directions of the electrical steel sheets constituting the first electrical steel sheets being different from the punching directions of the electrical steel sheets constituting the second electrical steel sheets.

3. The motor according to claim 2, wherein the first electrical steel sheets are constituted by a half of the total electrical steel sheets while the second electrical steel sheets are constituted by another half of the total electrical steel sheets.

4. The motor according to claim 1, wherein
the outer peripheral surfaces are fixed to the case and the inner peripheral surfaces include a plurality of teeth facing the rotor and extending radially inwardly and slots each formed into a recess shape between the teeth adjacent to each other,
the punching directions of outer peripheral surfaces of the electrical steel sheets constituting an outer peripheral surface of the stator are different from the punching directions of at least the slots provided at inner peripheral surfaces of the electrical steel sheets constituting an inner peripheral surface of the stator, and
the shear droops generated upon punching are formed at least at corner portions provided at the teeth facing the slots at both axial ends of the inner peripheral surface of the stator.

5. A method for manufacturing a motor which includes a rotor, a stator formed by a lamination of electrical steel sheets, and a case accommodating the rotor and the stator, the method comprising;
a press process for forming the electrical steel sheets by means of a press working;
a lamination process for laminating the electrical steel sheets so that surfaces of the electrical steel sheets arranged at one end of the stator in a lamination direction thereof and at the other end of the stator in the lamination direction thereof respectively facing each other; and
a fixation process for fixing the stator being laminated to the case;
wherein the electrical sheets include first electrical steel sheets arranged at the one end of the stator and second electrical steel sheets arranged at the other end of the stator,
wherein outer peripheral surfaces of the first electrical sheets include shear droops forming burrs extending in a direction away from the second electrical sheets, and outer peripheral surfaces of the second electrical sheets include shear droops forming burrs extending in a direction away from the first electrical sheets, and
wherein inner peripheral surfaces of the first electrical sheets include shear droops forming burrs extending in a direction toward the second electrical sheets, and outer peripheral surfaces of the second electrical sheets include shear droops forming burrs extending in a direction toward the first electrical sheets.

6. The method of manufacturing the motor according to claim 5, wherein the lamination process includes a process for laminating the electrical steel sheets arranged at the one end of the stator and a predetermined number of electrical steel sheets, all of which punching directions are equal to one another, and a process for laminating the electrical steel sheet arrange at the other end of the stator and a predetermined number of electrical steel sheets, all of which punching directions are equal to one another.

* * * * *